Dec. 6, 1960    E. A. HAWK, SR ET AL    2,962,786
APPARATUS FOR FORMING COMPOSITE EXTRUDED ARTICLES
Filed Nov. 7, 1957
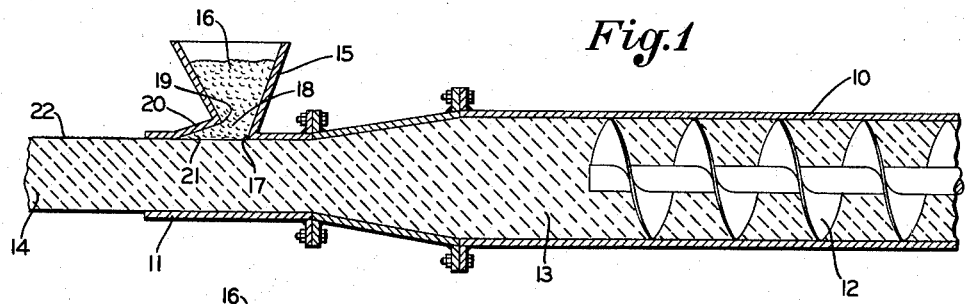
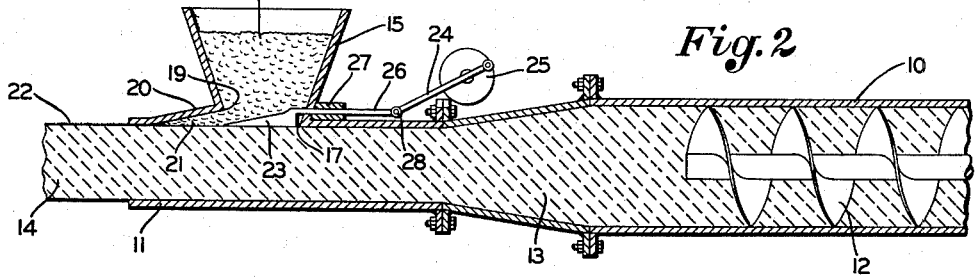
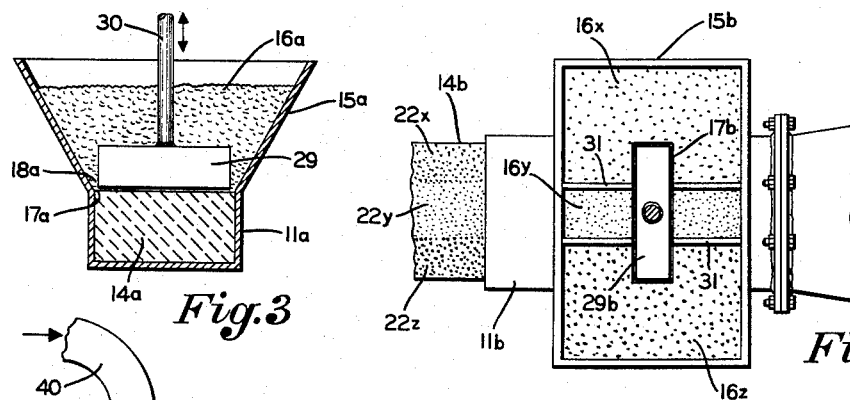
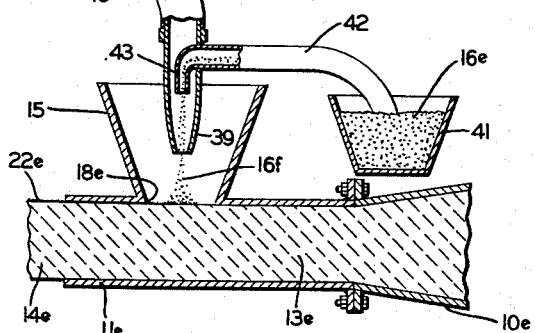
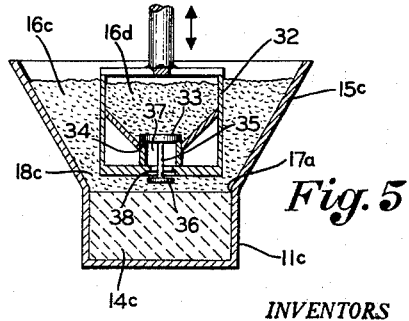
INVENTORS
Elwin A. Hawk, Sr.,
Elwin A. Hawk, Jr.,
Pietro P. Marchiano
Frease & Bishop
ATTORNEYS

United States Patent Office 2,962,786
Patented Dec. 6, 1960

2,962,786

APPARATUS FOR FORMING COMPOSITE EXTRUDED ARTICLES

Elwin A. Hawk, Sr., and Elwin A. Hawk, Jr., both of R.D. 1, East Rochester, Ohio, and Pietro P. Marchiano, Box 62, Malvern, Ohio Filed Nov. 7, 1957, Ser. No. 694,987

5 Claims. (Cl. 25—1)

The invention relates to the forming of composite articles and more particularly to apparatus for forming composite extruded articles by applying a finely divided material to one or more surfaces of an extruded plastic column, and the present application is a continuation-in-part of our copending application, Serial No. 651,077, filed April 5, 1957.

In said copending application apparatus is disclosed and claimed for extruding a composite article formed of two or more different materials bonded together in an integral body. The apparatus disclosed in said copending application includes an elongated tubular housing having an extrusion die at one end thereof, with means for extruding a column of plastic material therethrough, and means for charging a different plastic material into one or more sides of said tubular housing so as to form an extruded composite article in which the two or more materials are bonded together.

The present application relates more particularly to an apparatus in which a column of plastic material is extruded from an elongated tubular housing through an extrusion die at one end of the housing and means is provided for charging a dry or finely divided material into one or more sides of the tubular housing or die so as to form an extruded composite article in which the plastic material and dry or finely divided material are bonded together.

Another object of the invention is to provide such an apparatus in which ground preburned clay, shale or other ceramic material, sand, unburned dry clay, shale or other ceramic material, copper or other metal filings or metal oxides mixed with either raw or burned ceramic material, carborundum, sawdust, coke breeze, finely divided coal or other combustible materials, or wet ceramic materials may be applied to one or more sides of a moving column of plastic clay, shale or other ceramic material at any point from the extrusion die to the opposite end of the tubular housing through which the column of plastic material is moved.

A further object of the invention is to provide such an apparatus in which any of the finely divided materials above referred to may be charged upon a surface of the moving column of plastic material by gravity.

A still further object is to provide such an apparatus in which a finely divided material may be fed to a surface of the moving column of plastic material by gravity and pressed into intimate contact therewith as by a wedge block reciprocating in a plane parallel to the column.

Another object of the invention is to provide such an apparatus in which the finely divided material may be pressed into intimate contact with a surface of the moving plastic column by means of a plunger reciprocating perpendicularly to the moving column.

A further object of the invention is to provide apparatus of the character referred to in which a hollow reciprocating plunger may be provided for applying two different finely divided materials to a surface of the moving column in any desired design.

It is also an object of the invention to provide apparatus of this character in which a hopper is provided having a plurality of compartments therein for containing different finely divided materials, with a plunger cooperating therewith for applying the different materials on different portions of a surface of the moving plastic column.

Another object of the invention is to provide apparatus of this character in which finely divided dry materials or wet ceramic materials may be applied to one or more surfaces of the moving plastic column by means of an air blast.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

In general terms the invention may be briefly described as comprising an elongated tubular housing having an extrusion die at one end thereof and means for feeding a column of plastic material through said tubular housing and extruding the same through the die. This may be in the form of the apparatus shown in our copending application above referred to, or the invention may be applied to a conventional brick machine having an extrusion die.

At any point from the extrusion die itself throughout the length of the tubular housing through which the plastic column is moving, a hopper may be provided for containing finely divided materials such as ground preburned or raw clay, shale or other ceramic material, sand, copper or other metal filings or metal oxides, mixed with raw or burned ceramic material, carborundum, sawdust, coke breeze, finely divided coal or other combustible materials, or wet ceramic materials to be applied to one or more sides of the moving plastic column.

A slot or opening forms communication between the hopper and the interior of the die or the tubular column as the case may be. The finely divided material may be fed from the hopper by gravity into contact with one or more surfaces of the moving plastic column Means may be provided for pressing the finely divided material into contact with the surfaces of the plastic column, such means comprising either a wedge block reciprocating parallel to the moving column or a plunger operated by fluid cylinder or manual means reciprocating transversely to the moving column.

The plunger may be hollow with a valve therein, whereby different materials, or materials of different color, may be impressed upon a surface of the moving plastic column in any desired design. The hopper may be divided by partitions into a plurality of compartments containing different materials or materials of different colors.

As a modification of the appaartus, the finely divided material may be charged upon one or more surfaces of the moving column of plastic material by means of an air blast.

Having thus briefly described the invention, reference is now made to the accompanying drawings, in which:

Fig. 1 is a longitudinal sectional view of an apparatus embodying the invention, wherein finely divided materials may be charged upon a surface of a moving column of plastic material;

Fig. 2 is a view similar to Fig. 1, showing a wedge block reciprocating parallel to the moving column of plastic material for pressing the finely divided material into intimate contact with the surface of the column;

Fig. 3 is a transverse sectional view through an extrusion die and a hopper communicating therewith, showing a plunger reciprocating perpendicularly to the moving column of plastic material for pressing finely divided material into intimate contact with a surface thereof;

Fig. 4 is a top plan view of a hopper with partitions therein for containing different materials or different colored materials to be charged against a surface of the moving column of plastic material and pressed into intimate contact therewith by the plunger;

Fig. 5 is a view similar to Fig. 3, showing a hollow plunger with a valve therein, by means of which different kinds or colors of materials may be impressed in a design upon a surface of the moving plastic column;

Fig. 6 is a longitudinal sectional view showing a modified form of the apparatus in which the finely divided material is applied to the surface of the moving plastic column by means of an air blast; and Fig. 7 is a perspective view of a brick or the like cut from a column extruded from the apparatus showing the top and one end surface thereof coated with a finely divided material.

Referring first to the embodiment of the invention illustrated in Fig. 1, the tubular housing 10 may be a portion of a conventional brick machine, or may be the corresponding portion of the apparatus shown in our copending application Serial No. 651,077, of which this application is a continuation-in-part.

An extrusion die 11 is located at the forward or discharge end of the housing 10 and a feed screw 12, or other conventional means is provided for feeding clay, shale or other ceramic material, as indicated at 13, forwardly through the tubular housing 10 and extruding it through the die 11 in a plastic column 14, which may then be cut into bricks or blocks in usual and well known manner.

The present invention is concerned with means for applying a layer of a finely divided material upon one or more faces of the plastic column 14 as it is extruded from the apparatus. This finely divided material may be ground preburned clay or shale, or unburned dry clay or shale, sand, copper or other metal filings, or metal oxides which may be mixed with burned or unburned dry ceramic material, carborundum, sawdust, coke breeze, powdered coal or other combustible material which will burn out in the firing of the composite bricks or the like, leaving a mass of irregular voids in the treated surface of the brick, or wet ceramic materials may be used. Throughout the specification and claims the term "finely divided material" shall be understood to include such materials.

For this purpose a hopper is located on the apparatus for containing the desired finely divided material, in position to discharge such material onto the desired face of the moving column of plastic material. This hopper may be located at any point from the extrusion die 11 to the rear end of the tubular housing 10. If it is desired to impregnate the finely divided material into two or more surfaces of the plastic column, the desired number of hoppers may be located at the required positions.

For the purpose of illustration such a hopper is shown at 15, located on the top of the extrusion die 11, so as to charge the finely divided material 16 therein onto the top face of the moving plastic column. A slot or aperture 17 is formed in the top of the die communicating with the open throat 18 of the hopper so that the finely divided material 16 in the hopper will be in continual contact with the moving plastic column.

Thus a uniform amount of the finely divided material 16 will be continuously picked up by the top face of the moving plastic column. In order to assist in bringing the finely divided material 16 into intimate contact with the surface of the plastic column, the throat 18 of the hopper may be spaced slightly away from the column at the forward side of the hopper as at 19, and the top wall of the die is inclined forwardly and downwardly therefrom, as shown at 20.

A forwardly tapered space 21 is thus formed between the top wall of the die and the top wall of the moving plastic column, whereby the finely divided material will be carried forwardly through said space by the moving column and will be continually wedged between the wall 20 of the die and the top surface of the plastic column. Since the top wall 20 of the die is inclined downwardly and forwardly into contact with the moving plastic column, surplus material 16 will be retained in the space 21, so that a uniform coating or layer of the finely divided material is applied to the surface of the plastic column, as indicated at 22.

While the drawing shows only a single hopper located upon the top of the die, it should be understood as explained above that such hoppers may be located on two or more sides of the die or other point along the length of the feed tube, in the manner in which material is fed to the moving clay column in our above-mentioned copending application.

In Fig. 7 is shown a brick or block 14' which has been cut in conventional manner from a column as indicated at 14, showing the top and one end surface thereof coated with layers 22 of finely divided material applied in the manner above disclosed.

In the embodiment of Fig. 2, all of the parts shown in Fig. 1, are of the same construction and arrangement and are indicated by the same reference characters. This embodiment of the invention includes a reciprocating wedge block 23 for pressing the finely divided material 16 upon the surface of the moving plastic column.

The wedge block 23 is of substantially the size and shape of the tapered space 21 and is adapted to be reciprocated into and out of said tapered space. Any conventional means may be provided for reciprocating the tapered block 23 in a plane parallel with the moving plastic column as by connecting rod 24 and pitman wheel 25. In order to guide the wedge block 23 as it is reciprocated, a rigid rod 26 upon said block is slidably located through the sleeve 27 and pivotally attached to the connecting rod 24 as at 28.

As the wedge block 23 is retracted, as shown in Fig. 2, the material 16 will pass down into contact with the top surface of the moving plastic column and will be carried forwardly thereby into the tapered space 21. On the forward movement of the block 23 it will enter the tapered space 21 pressing the material 16 into the top surface of the plastic column.

In the embodiment of Fig. 3, a plunger is provided in the hopper for reciprocation perpendicular to the moving plastic column so as to press finely divided material into the surface of the column. The hopper 15a is shown upon the top of the die 11a, the throat 18a of the hopper communicating with the interior of the die through the opening 17a therein.

The plunger 29 is located in the hopper and adapted to be reciprocated through the throat 18a of the hopper and the opening 17a in the top of the die. This plunger may be reciprocated by any conventional mechanical or fluid cylinder means attached to the rod 30.

The reciprocation is perpendicular to the path of the plastic column 14a and need be very slight. As the plunger 29 is raised, finely divided material 16a will pass down beneath the plunger and into contact with the top surface of the moving plastic column 14a. Upon the down stroke the plunger will press this material tightly into the top surface of the column.

Several different kinds or different colors of finely divided material may be applied to different portions of the same surface of the moving plastic column by the form of the invention shown in Fig. 4. The hopper 15b is shown mounted upon the top of the extrusion die 11b.

and communicates with the interior of the die through the opening 17b. A plunger 29b may, if desired, be located in the hopper for operating through the opening 17b in the same manner as the plunger 29 operates through the opening 17a in Fig. 3.

For the purpose of applying different kinds or colors of material to one face of the plastic column, the hopper may be divided into a plurality of compartments by the partition walls 31. Different kinds or colors of material may be placed in the several compartments of the hopper as indicated at 16x, 16y and 16z, and these different materials will be fed onto the top surface of the plastic column 14b forming the zones 22x, 22y and 22z thereon.

If it is desired to produce designs of different kinds or colors of materials upon a surface of the column, the embodiment of Fig. 5 may be used. The hopper 15c is located upon the die 11c and the open throat 18c of the hopper communicates through the opening 17a with the interior of the die.

The plunger 32 is hollow and is adapted to be reciprocated toward and from the column 14c by any usual mechanical or fluid cylinder means. A valve 33 is located in the lower portion of the hollow plunger and seats upon the valve seat 34 when the plunger is raised. A valve stem 35 depends from the valve 33 and has a presser foot 36 upon its lower end.

One kind or color of material is located in the hopper 15c as indicated at 16c and a different kind or color of material is located in the hollow plunger 32 as indicated at 16d. As the plunger 32 is lowered into contact with the top surface of the plastic column 14c the presser foot 36 contacting the top of the column raises the valve 33 from its seat and admits a measured amount of the material 16d into the cylinder 37. The pressure foot 36 being at this time seated in the opening 38 will retain the material 16d in said cylinder.

Upon the upstroke of the plunger 32 material 16c will pass down from the hopper beneath the plunger, and at the same time the pressure foot 36 will drop out of the opening 38, delivering the measured amount of material 16d from the cylinder 37 through the opening 38 upon the surface of the column.

A design of the shape of the opening 38 of material 16d will thus be formed upon the surface of the column while the remainder of the surface will be covered with a layer of the different material 16c.

Upon the next downstroke of the plunger the material 16c and 16d will be pressed tightly upon the surface of the plastic column by the plunger and another measured amount of material 16d will be admitted to the cylinder 37 by the opening of the valve 33. In order that the designs may be properly located so that they will appear in the proper position on the bricks or blocks, the movement of the plunger may be synchronized with the movement of the plastic column by any well known means.

In Fig. 6 is shown a modification of the invention in which the finely divided material may be charged upon the surface of the plastic column by means of an air blast. The feed tube 10e and die 11e may be conventional. The hopper 15e may be located upon a side of the die and communicates with the interior of the die through the opening 18e. The plastic column 13e is moved toward the die in conventional manner.

An air nozzle 39 is directed toward the adjacent surface of the column through the opening 18e. A hose 40 connects the nozzle 39 with a suitable source of air pressure. Material 16e is located in a container 41 and a tube 42 leads from said container to a venturi 43 within the nozzle. Thus as the plastic column 13e moves through the feed tube material 16e is impinged thereon by the air blast as indicated at 16f, and the extruded column 14e has a coating of the material thereon as indicated at 22e.

From the above it will be evident that various kinds and colors of finely divided materials may be applied to one or more surfaces of a moving plastic column to produce various textures and surface coatings upon bricks and the like cut from the column in conventional manner.

In actual practice a wide variety of coarse and fine textures and various designs and color arrangements may be obtained, producing many very beautiful effects at a minimum of labor and expense.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. Apparatus for forming composite articles of different materials integrally bonded together, said apparatus comprising a tubular housing, an extrusion die at one end of said housing, means for feeding a column of plastic material through said tubular housing and extruding it through said die, a single means for feeding a plurality of different finely divided materials into contact with a side of the moving column of plastic material, pressing means located adjacent to said side of the column of plastic material, said material emanating from separate sources, and means for reciprocating said pressing means for pressing said finely divided materials into said side of the plastic column so that the column of plastic material is extruded from said die with a layer of a plurality of different finely divided materials impregnated in and bonded to said side thereof.

2. Apparatus for forming composite articles of different materials integrally bonded together, said apparatus comprising a tubular housing, an extrusion die at one end of said housing, means for feeding a column of plastic material through said tubular housing and extruding it through said die, means for feeding a plurality of different finely divided materials into contact with a side of the moving column of plastic material, pressing means located adjacent to said side of the column of plastic material, and means for reciprocating said pressing means toward and from said side of the plastic column for pressing said finely divided materials into said side of the plastic column so that the column of plastic material is extruded from said die with a layer of a plurality of different finely divided materials impregnated in and bonded to said side thereof.

3. Apparatus for forming articles of different materials integrally bonded together, said apparatus comprising a tubular housing, an extrusion die at one end of said housing, means feeding a column of plastic material through said tubular housing and extruding it through said die, a hopper containing finely divided material on one side of said apparatus, said hopper having a discharge opening communicating with the interior of the apparatus for directing the finely divided material into contact with a surface of the moving column of plastic material, a hollow plunger in the hopper, said hollow plunger containing a different finely divided material, a valve in the hollow plunger, and means for reciprocating the plunger perpendicular to the column to press the finely divided materials into said surface of the column, so that the column of plastic material is extruded from the die with a layer of different finely divided materials impregnated in and bonded to said side thereof.

4. Apparatus as defined in claim 1 in which the means for feeding a plurality of different finely divided dry materials includes a hopper divided into a plurality of compartments containing different finely divided dry materials.

5. Apparatus as defined in claim 1 in which the means for feeding a plurality of finely divided dry materials includes a hopper containing finely divided dry material and a hollow plunger containing a different finely divided dry material.

References Cited in the file of this patent
UNITED STATES PATENTS

| | | |
|---|---|---|
| 685,410 | Ramsay | Oct. 29, 1901 |
| 739,881 | Kilborn | Sept. 29, 1903 |
| 1,771,660 | Stewart | July 29, 1930 |
| 2,456,141 | Myerson | Dec. 14, 1948 |